(No Model.)

R. G. FERGUSON.
DISH CLEANER.

No. 493,261. Patented Mar. 14, 1893.

WITNESSES:
John W. Fisher
S. B. Brown

INVENTOR,
Robert G. Ferguson
BY William K. Low
ATTORNEY.

THE NORRIS PETERS CO., PHOTO-LITHO., WASHINGTON, D. C.

UNITED STATES PATENT OFFICE.

ROBERT G. FERGUSON, OF LAKEWOOD, NEW JERSEY.

DISH-CLEANER.

SPECIFICATION forming part of Letters Patent No. 493,261, dated March 14, 1893.

Application filed September 11, 1891. Serial No. 405,370. (No model.)

*To all whom it may concern:*

Be it known that I, ROBERT G. FERGUSON, of Lakewood, in the county of Ocean and State of New Jersey, have invented new and useful Improvements in Dish-Washing Machines, of which the following is a specification, reference being had to the accompanying drawings, which form part of this specification, and in which—

Figure 1:
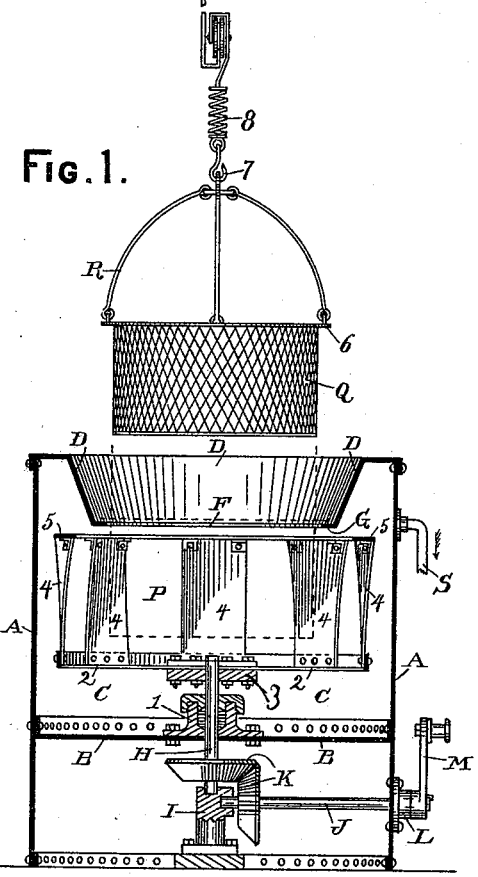
Figure 3:
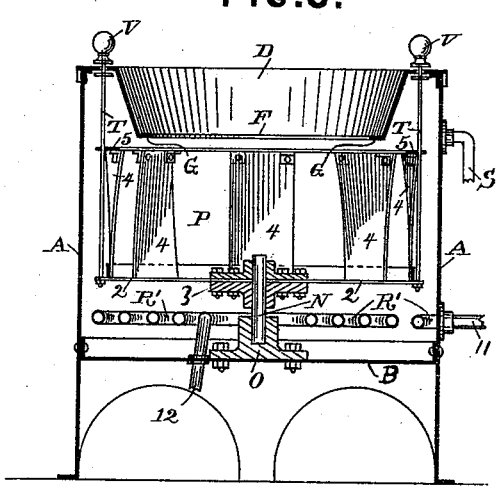
Figure 2:
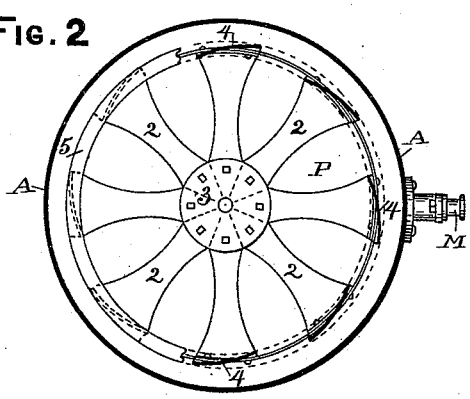
Figure 4:
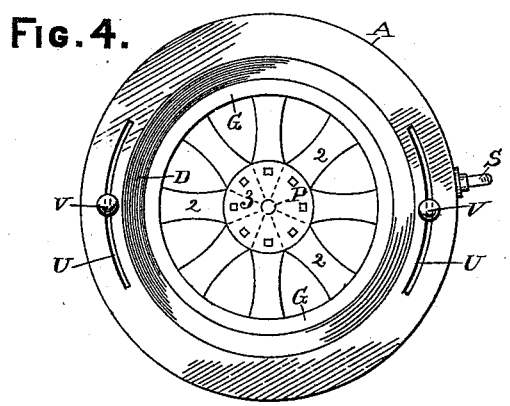

Figure 1 is a vertical section of my invention fitted to be operated by power. Fig. 2 is a horizontal section. Fig. 3 is a vertical section of my invention arranged to be operated by hand; and Fig. 4 is a plan view of Fig. 3.

My invention relates to machinery for effecting the washing of dishes mechanically, and it consists of a tank for containing water, an agitator located in said tank and arranged to make partial revolutions, alternately in opposite directions, so as to dash the water centripetally in said tank, an open-work metallic basket held in a stationary position in said tank and adapted to contain the dishes while they are being washed, and means, substantially as described, for operating said agitator.

As represented in the drawings, A designates the tank of my machine, which is preferably made cylindrical and is provided with a diaphragm, B, fixed above the lower end of the tank so as to form a water-tight chamber, C in the upper part of said tank; the upper end of said tank is provided with a recessed head, D, having a circular central opening F, surrounded by an annular flange, G, for a purpose hereinafter explained.

As shown in Fig. 1, a stuffing-box, 1, is centrally attached to the diaphragm B for the purpose of forming a water-tight journal-box for the vertical shaft, H, which passes through said diaphragm; the lower end of said shaft is journaled in a step-bearing, I, in which the inner end of a horizontal rock-shaft, J, is also journaled. The shafts H and J are each provided with like bevel-gears, K, or—when preferred bevel segmental-gears of the same pattern. The outer end of the shaft J is journaled in a bearing, L, attached to the shell of the tank A, and the protruding end of said shaft is provided with an arm, M, that is connected by any suitable means to mechanism that will impart a rocking motion to the shaft J, and said motion should about equal one fourth of a complete revolution.

In the modified form of my invention shown in Figs. 3 and 4, a short vertical shaft, N is journaled in a step-bearing, O, that is secured to the upper side of the diaphragm B.

P designates the agitator of my machine, the same being used in both forms of the machine herein shown and described; said agitator consists of a series of radial-arms 2, which are secured to a center 3, fastened to the central shaft—designated as H in Fig. 1, and as N in Fig. 3—and to the outer end of each of said radial-arms there is attached a vertical bucket or dasher, 4, and each of said buckets is arranged at an angle to a radial line drawn from the central pivot of said agitator; the upper end of each bucket is secured to an annulus, 5, for the purpose of obtaining a required support for the buckets at that point; the central space in said agitator—between the inner edges of the buckets—is left entirely free and unobstructed for the reception of a metallic-basket, Q, which is made of a cylindrical form, to pass into the central opening G of the head D. The basket Q is made of wire, or other suitable form of metal, woven in open-work so as to leave ample freedom for the passage of water into and out of the sides and bottom of said basket, and a circumferential flange, 6, is arranged flatwise around the upper end of said basket, and is fitted to rest on the annular flange G of the head D, so as to retain said basket in position during the operation of washing the dishes contained therein. The basket Q is hung, by means of a yoke R—or other suitable appliance—to a hook, 7, attached to a spring, 8, which is preferably suspended from a wheel, 9, fitted to run on an overhead track, 10, arranged directly over the tank A; the spring 8 should possess sufficient elasticity to permit the basket Q—when the latter is filled with dishes—to move freely up and down, while the water is being churned through said basket by the action of the agitator P. Preferably a steam-coil, R', is arranged in the lower part of the chamber C, as shown in Fig. 3, for the purpose of heating the water contained in said chamber—and it should be understood that such a coil can be used in any form of my invention if required—said coil having a steam-supply pipe, 11, and a waste-pipe, 12, connected to its opposite ends for the purpose of supplying steam thereto and for conveying the condensation therefrom; said steam-supply and waste-pipes should be provided with the usual valves or stop-cocks for controlling the steam that will pass through said coil. At the line of the water-level of the tank A, the latter is provided with an overflow-pipe, S, for the purpose of carrying off the scum or grease which will float on the surface of the water.

In the modified form of my invention, as shown in Figs. 3 and 4, the agitator P is provided with oppositely-arranged vertical-handles, T, each of which extends through the head D, a curved slot, U, being formed at diametrically-opposite sides of said head for the purpose of allowing the agitator P to be swung on its central shaft N in opposite directions alternately, the extent of each phase of said movement being equal to about one-fourth of an entire revolution; each handle T is provided with a head, V, which affords a suitable device for the operative to grasp.

My invention is operated in the following manner: The tank A being charged with water which is preferably kept hot—by means of the steam coil R—and which may be charged with alkali or other cleansing preparation, the basket Q—suitably filled with dishes—is brought into position over the opening F and lowered until the flange 6 rests lightly upon the flange G of the head D; the agitator P is then oscillated—either by means of power—as shown in Figs. 1 and 2—or by hand—as shown in Figs. 3 and 4, and by these oscillatory motions in one direction, the agitator will force the water centripetally and upwardly through the spaces between the dishes in said basket, and the motions in the opposite directions will cause the water to move downwardly and centrifugally through the spaces between the dishes; the alternating upward and downward movement of the water through the basket Q will cause an agitation of the dishes in said basket whereby the dishes are slightly separated from each other to present different surfaces of said dishes for the water to operate upon; the grease and scum from the dishes will rise to the surface of the water in the tank A, and from thence will be carried off through the over-flow pipe S. When the dishes in the basket Q have been sufficiently cleansed, the basket should be raised and, after draining, the basket should be moved back on the track 10.

I am aware that dish-washing machines have heretofore been constructed, comprising a stationary tank, a basket for containing dishes, and means for forcing water upwardly between said tank and basket, the water entering said basket near its upper end and being carried by gravity downward between the dishes and discharged from the bottom of the basket: I do not claim such constructions, but—

What I claim as my invention, and desire to secure by Letters Patent, is—

1. In a dish-washing machine, the combination of a stationary water-tank A, an open-work circular basket or cage, Q, for holding the dishes in a stationary position in said tank, a circular agitator, P, surrounding said basket and provided with tangentially-arranged dashers 4, and means—substantially as described—for imparting an oscillatory motion to said agitator; whereby currents of water will be alternately injected centripetally into and ejected centrifugally out of said basket in a forcible manner, as and for the purpose herein specified.

2. In a dish-washing machine, the combination of a stationary water tank A provided with a recessed head D having a central opening F and annular-flange G, an open work circular basket or cage Q provided with a circumferential flange 6 fitted to bear upon the annular-flange G, an oscillating agitator P surrounding said basket and provided with tangentially-arranged dashers 4, and means—substantially as described—for imparting oscillatory motion to said agitator, as and for the purpose herein specified.

ROBERT G. FERGUSON.

Witnesses:
F. S. QUINTANG,
J. C. NEWMAN.